Figure 1:
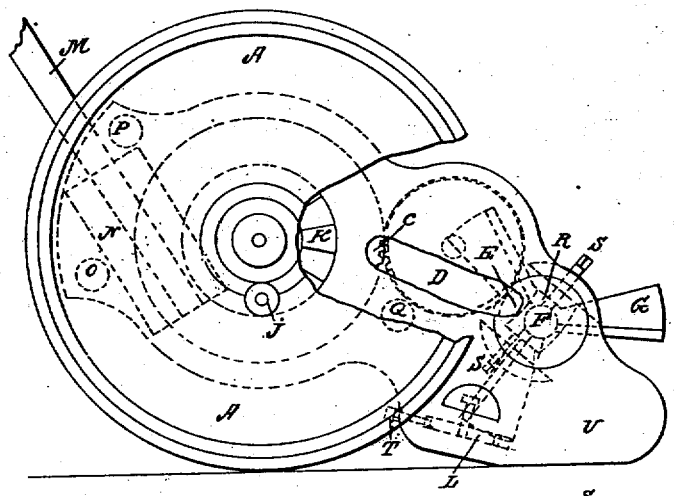
Figure 1:
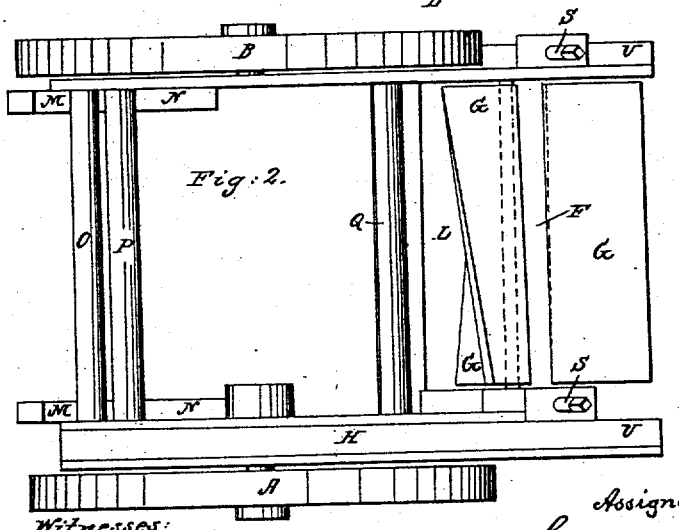

J. ARBEITER.

Lawn Mower.

No. 3,784. Reissued Jan'y 4, 1870.

Witnesses:

E. W. Bliss.

Jenny W. Bliss.

Assignee:

Saml. Coit

N. PETERS, Photo-Lithographer, Washington, D. C.

UNITED STATES PATENT OFFICE.

SAMUEL COIT, OF HARTFORD, CONN., ASSIGNEE OF JOSEPH ARBEITER.

IMPROVED LAWN-MOWER.

Specification forming part of Letters Patent No. 89,004, dated April 20, 1869; Reissue No. 3,784, dated January 4, 1870.

*To all whom it may concern:*

Be it known that I, SAMUEL COIT, of the city and county of Hartford, and State of Connecticut, (assignee of JOSEPH ARBEITER, patentee of certain new and useful Improvements in Lawn-Mowers, dated April 20, 1869, No. 89,004,) do hereby declare the following specification to be clear and exact, so as to enable others skilled in the art to make and use the same therefrom; and I will proceed to describe, referring to the drawings, in which the same letters indicate like parts in each of the figures; dotted lines show concealed parts.

Figure 1 shows a side elevation of the improved lawn-mower, with a portion of the wheel and interior casing removed, so as to show the interior parts. Fig. 2 is a plan or top view of the machine.

The invention consists in so constructing lawn-mowers that motion is communicated to the revolving cutter through the medium of the sustaining-wheels and intermediate closed gear-wheels, and the means of adjusting the revolving cutter with relation to the stationary cutter, when the parts are constructed as hereinafter described.

In the drawings, A and B represent the two sustaining, as well as driving, wheels, which, by pushing the machine forward or back, give them a revolving motion, and by such revolution, through the intermediate gear-wheels C D E, motion is communicated, by wheel A, to the revolving cutter, which is composed of the arbor F and oblique or inclined blades G G.

The wheels C D E are inclosed in case H, and are protected by said case from being fouled by either short blades of grass or dust, or from being interfered with by any external object.

The frame of the machine is composed of the side of box or case H, and a corresponding-shaped plate, I, on the opposite side from the case, and are connected together by cross-bars O P Q. The outside plate of case H and plate I extend both forward and back of the axles or arms of wheels A B, the forward ends dropping down to the ground, and forms the shoe or runners U U.

Wheels A B have axles or arms, upon which they revolve, firmly fixed to case H and plate I, by which construction the frame H I can rotate on said axles. Inserted in elongated slots, near to the bottom of the forward ends of plates H and I, is the cutter L, which can be adjusted horizontally by means of the screws T T. R R are journal-boxes placed in openings in the sides H I, and contain the journals of the shaft of the revolving cutter, and in which the said journals revolve. The boxes R R are adjusted by temper-screws S S, which move the said boxes in grooves concentric with the axis of gear-wheel D, and thereby the revolving cutter is adjusted toward or from the cutter L, as may be desired.

In the drawings, a portion of wheel A and outside plate of case H are cut away in order to show the wheels C, D, and E, and ratchet K on the side of wheel C.

J is a spring-pawl pin operating upon the ratchet K of wheel C through an opening in the outside of case H, in such manner that when the machine is pushed forward the pawl takes into the teeth of the ratchet, and causes wheel C, and with it wheels D E and cutter G, to revolve; but when the machine is run backward, the pawl slides over the teeth of the ratchet K by coming in contact with the inclined side of said teeth, and then none of the wheels or cutter will revolve; or the spring-pawl J may be so constructed as to be held out of contact with the ratchet K at will, so that the machine can be propelled forward or backward without revolving the cutter G. On the sides of case H and plate I are dovetail sockets N N to receive the propelling-handles M, which can be inserted and withdrawn at pleasure.

By this construction of lawn-mowers above described, dust and fine particles or pieces of grass or other matter are prevented from interfering with the operating parts of the machine. Driving-wheels of much larger diameter can be used than have been heretofore used on similar machines, which makes it more easy of operation, and allows a greater increase of velocity in the cutter, cutting the grass smoother and more even, and also enables the machine to be propelled without revolving the cutter while going to or from the work.

Having thus fully described the invention, what is claimed, and desired to be secured by Letters Patent, is—

1. The combination of the wheels A B, spring-pawl J, ratchet K on the side of wheel C, gear-wheels C D E, inclosed in the oscillating frame H, with the revolving cutter F G G, when constructed and arranged to operate in the manner and for the purpose described.

2. The combination of the revolving cutter F G G, adjustable journal-boxes R R, moving in curved grooves concentric with the axis of wheel D, and adjustable cutter L, with the frame H I, when said frame is fixed to and can be revolved on the axles of wheels A and B, in the manner and for the purpose described.

SAML. COIT. [L. S.]

Witnesses:
E. W. BLISS,
JEREMY W. BLISS.